United States Patent [19]

Smit

[11] Patent Number: 4,895,656

[45] Date of Patent: Jan. 23, 1990

[54] ADJUSTABLE COFFEE FILTER

[75] Inventor: Gerard C. Smit, Amerongen, Netherlands

[73] Assignee: Smitdesign B.V., Netherlands

[21] Appl. No.: 303,565

[22] Filed: Jan. 27, 1989

[30] Foreign Application Priority Data

Feb. 3, 1988 [NL] Netherlands .......................... 8800257

[51] Int. Cl.⁴ ........................ B01D 23/20; B01D 23/28
[52] U.S. Cl. ..................................... 210/481; 210/482;
210/497.01; 210/497.3; 222/441; 426/82;
206/0.5
[58] Field of Search ..................... 99/297, 299; 426/82;
210/473, 474, 477, 481, 482, 497.01, 497.3;
222/189, 322, 323, 325, 328, 340, 460, 472,
475.1, 441; 206/0.5

[56] References Cited

U.S. PATENT DOCUMENTS

| | | | |
|---|---|---|---|
| 778,695 | 12/1904 | McEwen | 210/473 |
| 892,000 | 6/1908 | MacKaskie | 210/497.3 |
| 1,053,316 | 2/1913 | Psikal | 222/441 |
| 1,361,146 | 12/1920 | Egnatuff | 222/441 |
| 1,607,530 | 11/1926 | Guest | 222/441 |
| 2,836,300 | 5/1958 | Serr | 210/248 |
| 4,353,484 | 10/1982 | Crawford | 222/189 |

FOREIGN PATENT DOCUMENTS

| | | |
|---|---|---|
| 0091634 | 9/1983 | European Pat. Off. . |
| 0111969 | 6/1984 | European Pat. Off. . |
| G7618187 | 11/1976 | Fed. Rep. of Germany . |
| G8027643.3 | 3/1981 | Fed. Rep. of Germany . |
| G8200962.7 | 7/1982 | Fed. Rep. of Germany . |
| G8437582.5 | 12/1986 | Fed. Rep. of Germany . |
| 538609 | 6/1922 | France .................. 222/472 |

Primary Examiner—Richard V. Fisher
Assistant Examiner—Wanda L. Millard
Attorney, Agent, or Firm—Peter L. Michaelson

[57] ABSTRACT

A coffee filter for a coffee making apparatus, comprising a funnel or holder (1) for receiving a filter element containing ground coffee, said funnel having at least at its lower end an inclined wall section (2), an outflow opening (4) in said wall (2) for draining coffee brew into a container positioned under said funnel (1), a disc valve (18) for selectively closing said outflow opening (4), said valve (18) being controlled by control means comprising a slide (6) guided in a slit (5) provided in a vertical wall section (3) arranged opposite to said inclined wall section (2), said slide (6) having a grip (6') at the outer side and a cam (7) with an undulated surface (8), at the inner side of said vertical wall section (3), said disc valve (18) being connected to one end (17) of a lever (14), the other lever end (16) being designed as a cam follower cooperating with said undulating cam surface (8), a leaf spring (10) extending transversely across the space between the inclined wall section (2) and the vertical wall section (3) and biasing the lever (14) in the sense of closing the outflow opening (4).

16 Claims, 2 Drawing Sheets

ADJUSTABLE COFFEE FILTER

This invention relates to a coffee filter for a coffee making apparatus, i.e. a holder for receiving a suitable filter element often of paper, and a quantity of ground coffee. Such a coffee filter is placed in the coffee making apparatus under a hot water outflow pipe and above some kind of coffee receptacle. The hot water extracts the ground coffee in the coffee filter and flows through an outflow opening at the bottom of the filter into a receptacle, with the ground coffee being retained by the filter element.

In a known coffee filter of funnel configuration, the coffee outflow opening is in the axis of the filter in the bottom. For interrupting the coffee flow, for stopping drippage or for controlling the flow rate, the known coffee filter contains a disc-shaped valve member of resilient material with a valve stem extending through the outflow opening and being biased to the position closing the outflow opening by means of a helical spring provided about the valve stem and likewise disposed in the outflow opening. The disc valve can be lifted off the outflow opening to a greater or lesser extent by means of a cam or camming surface acting, upon lateral displacement, on the free end of the valve stem, which acts as a cam follower. The displacement of the control cam takes place through an operating lever having a fixed pivot point near the bottom end of the funnel and extending along the outside of the funnel to near the upper edge thereof. A number of drawbacks go with this known adjustable coffee filter, i.e. the position of the valve spring in the coffee outflow opening, which is unhygienic, the comparatively long and hence unstable operating lever, and the required rather complicated mounting operations.

It is an object of the present invention to provide a coffee filter wherein these drawbacks of the known coffee filter are avoided.

To that end the present invention provides a coffee filter for a coffee making apparatus, comprising a holder for receiving a suitable filter element, said holder having at least at the lower end a wall portion inclined relatively to the vertical axis and there being provided near the lower end a coffee outflow opening having a disc-shaped valve made from resilient material which, controlled by an operating member that is accessible from the outside is adapted to be brought into different positions relative to the outflow opening through the cooperation of a spring and a cam-and-follower assembly, characterized in that the outflow opening is provided in the inclined holder wall portion, in that at least opposite the outflow opening, at an interspace outside said inclined holder wall portion, there is provided a substantially vertical outer wall having a slit wherein a slide is mounted for axial adjustment, said slide carrying on the inside the cam with curved surface, said valve being attached to one end of a lever whose other end functions as a cam follower, and with a leaf spring extending across the space between the vertical outer wall and the inclined holder wall portion and biasing said lever in the sense of closing the outflow opening through the valve.

In the coffee filter according to the present invention, the entire valve mechanism is disposed exteriorly of the outflow opening and provides an easy access for inspection and cleaning purposes. The slide directly carrying the cam ensures a stable cam displacement and the lever may be short and hence stable, because the control cam is disposed at a short interspace directly opposite the outflow opening.

In a further elaboration of the present invention, the vertical wall portion opposite the outflow opening is connected to the inclined wall portion by two partitions on either side of the outflow opening, said partitions containing slits opening into their free lower edges for receiving the swivel shaft of the lever.

The lever is thereby stabilized laterally, while the assembly of the lever is restricted to the pushing of the swivel shaft of the lever into the slits.

By attaching according to the present invention the leaf spring to a bridge piece lockable in the open lower end of the slide-receiving slit, the entire valve and valve operating mechanism can be positioned by pushing the slide into the slit, placing the lever with its swivel shaft into the slits of the partitions and positioning the bridge piece. In addition to the valve operating function, the leaf spring then also has a retaining function for keeping the entire mechanism in place.

When furthermore, according to the present invention, the slit bottoms in the partitions, defining the pivot point of the lever, are spaced from the inclined holder wall portion containing the outflow opening and the lever has such a bend that in the closed position of the valve, the closing face of the valve disc lies flat on the inclined holder wall adjacent the outflow opening, the valve functions as a tilting poppet valve which, in the last stage of the closing range, performs a sliding movement across the outer surface of the inclined holder wall functioning as a valve seat. As a result, any contaminations on the seat surface or on the valve surface are scraped off, so that the valve is self-cleaning.

For the purpose of a perfect closure of the outflow opening, the valve disc may be provided with an annular projection surrounding the outflow opening in the closed position of the valve.

One embodiment of the coffee filter according to the present invention will now be described, by way of example, with reference to the accompanying drawings, in which.

Figure 1:
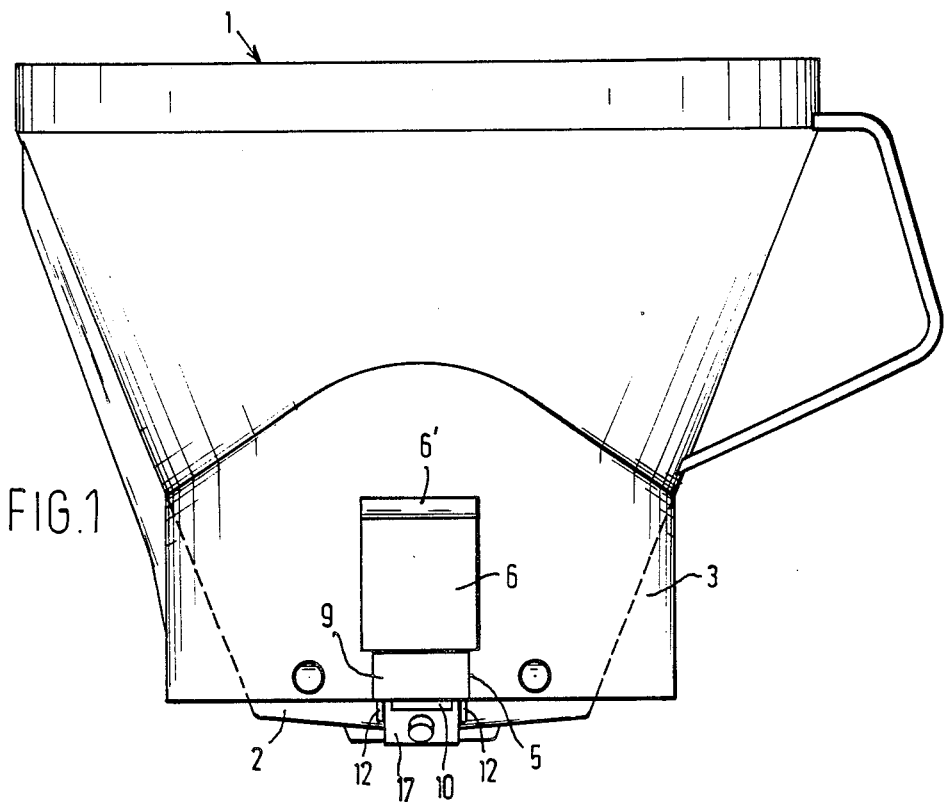
FIG. 1 is a lateral view of the coffee filter.
Figure 2:
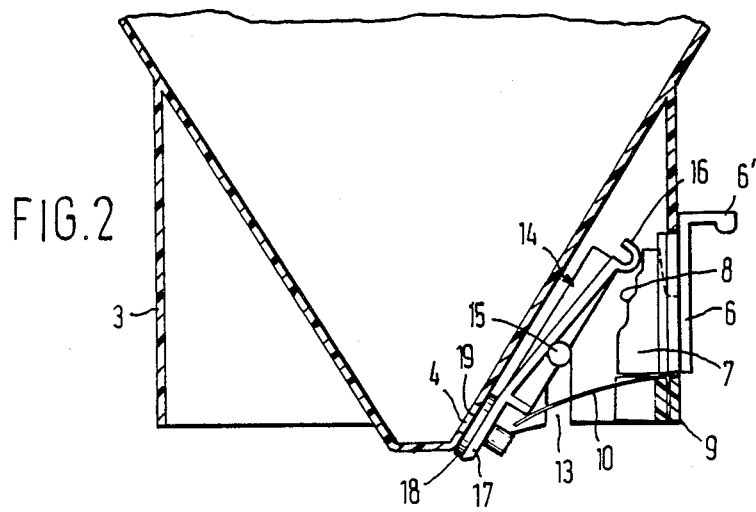
FIGS. 2 and 3 are axial cross-sectional views of the valve and the valve operating mechanism in the closed, and in the entirely opened position, respectively.
Figure 3:
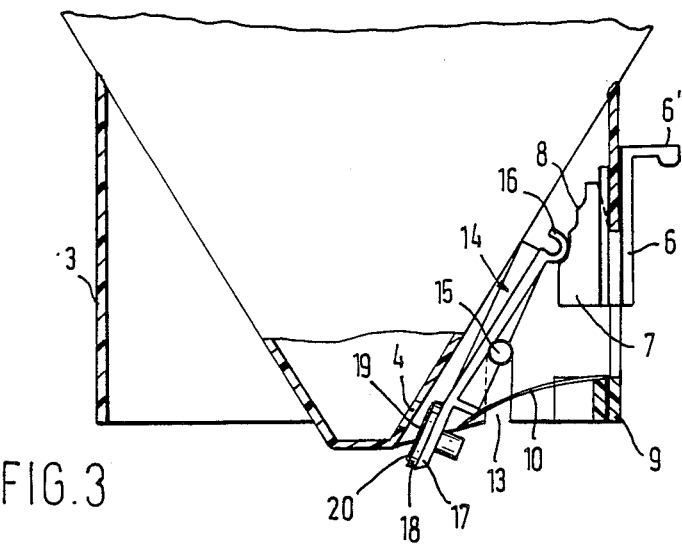

As shown in the drawings, the coffee filter is provided with a substantially funnel-shaped holder 1 having a flattened lower end 2. A cylindrical sheath 3 extends downwardly about the lower end.

One of the inclined holder wall portions 2 contains a coffee outflow opening 4 near the lower end of the holder. In the cylinder wall of sheath 3 there is formed a slit 5 wherein a slide 6 is slidable. Slide 6, on the inside of sheath 3, carries a cam 7 having an undulated surface 8. Slit 5 is closable by a bridge piece 9 wherein a leaf spring 10 is fitted.

Sheath 3 and holder wall 2 are interconnected by two partitions 12 on either side of slit 5 and the outflow opening 4. Slits 13 are formed in partitions 12.

Figure 4:
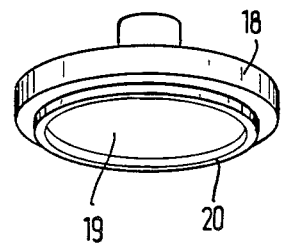
FIG. 4 is a perspective view of the valve disc.

A lever 14 is introduced with its swivel shaft 15 into slits 13 and is retained in place by leaf spring 10. One end 16 of the lever functions as a cam follower and the other end 17 carries the valve member 18. The lever end 17 is bent in such a manner that in the closed position of valve 18, the closing face 19 thereof lies flat on the outer surface of the inclined holder wall 2. The closing face 19 of valve 18 is provided with an upright annular edge 20 (see FIG. 4), which surrounds the outflow opening 4 in the closed position of the valve.

By vertically sliding the slide 6 by means of grip 6', which is accessible from the outside, the cam follower end 16 of lever 14 is displaced across the curved surface 8, thereby varying the inclination and hence the position of valve 18 relative to outflow opening 4.

I claim:

1. A coffee filter for a coffee making apparatus comprising a holder for receiving a suitable filter element, said holder having at least at a lower end thereof a wall portion inclined relatively to a vertical axis of said holder and there being provided near the lower end a coffee outflow opening having a disc-shaped valve made from resilient material which, controlled by an operating member that is accessible from outside the holder, is adapted to be brought into different positions relative to the coffee outflow opening through cooperation of a spring and a cam-and-follower assembly, characterized in that the outflow opening is provided in the inclined holder wall portion, that at least opposite the coffee outflow opening and at an interspace outside said inclined holder wall portion there is provided a substantially vertical outer wall having a slide-receiving slit wherein a slide is mounted for axial adjustment therein, said slide carrying on the inside of the substantially vertical wall the cam having a curved surface, said valve being attached to one end of a lever whose other end functions as the follower, and with a leaf spring extending substantially across the interspace between the substantially vertical outer wall and the inclined holder wall portion and biasing the lever so as to close the outflow opening through the valve.

2. The coffee filter as claimed in claim 1, characterized in that the substantially vertical outer wall portion situated opposite the coffee outflow opening is connected to the inclined holder wall portion on either side of the coffee outflow opening by two partitions, wherein swivel shaft receiving slits are formed i said partitions and are open at their free lower edges thereof for receiving a swivel shaft of the lever.

3. The coffee filter as claimed in claim 2 further characterized in that one end of the leaf spring is attached to a bridge piece lockable in an open lower end of the slide-receiving slit.

4. The coffee filter as claimed in claim 3 further characterized in that slit bottoms of the swivel shaft receiving slits are spaced apart from the inclined holder wall portion containing the coffee outflow opening; and the lever has a bend such that, in the closed position of the valve, a closing face of the valve lies flat on the inclined holder wall portion and is situated adjacent the coffee outflow opening.

5. The coffee filter as claimed in claim 4 further characterized in that the valve is a disk valve with a closing face and having an annular projection situated on the closing face.

6. The coffee filter as claimed in claim 2 further characterized in that slit bottoms of the swivel shaft receiving slits are spaced apart from the inclined holder wall portion containing the coffee outflow opening; and the lever has a bend such that, in the closed position of the valve, a closing face of the valve lies flat on the inclined holder wall portion and is situated adjacent the coffee outflow opening.

7. The coffee filter as claimed in claim 6 further characterized in that the valve is a disk valve with a closing face and having an annular projection situated on the closing face.

8. The coffee filter as claimed in claim 2 further characterized in that the valve is a disk valve with a closing face and having an annular projection situated on the closing face.

9. The coffee filter as claimed in claim 3 further characterized in that the valve is a disk valve with a closing face and having an annular projection situated on the closing face.

10. The coffee filter as claimed in claim 1 further characterized in that one end of the leaf spring is attached to a bridge piece lockable in an open lower end of the slide-receiving slit.

11. The coffee filter as claimed in claim 10 further characterized in that swivel shaft receiving slits are formed in said partition with slit bottoms spaced apart from the inclined holder wall portion containing the coffee outflow opening; and the lever has a bend such that, in the closed position of the valve, a closing face of the valve lies flat on the inclined holder wall portion and is situated adjacent the coffee outflow opening.

12. The coffee filter as claimed in claim 11 further characterized in that the valve is a disk valve with a closing face and having an annular projection situated on the closing face.

13. The coffee filter as claimed in claim 10 further characterized in that the valve is a disk valve with a closing face and having an annular projection situated on the closing face.

14. The coffee filter as claimed in claim 1 further characterized in that swivel shaft receiving slits are formed in said partition with slit bottoms spaced apart from the inclined holder wall portion containing the coffee outflow opening; and the lever has a bend such that, in the closed position of the valve, a closing face of the valve lies flat on the inclined holder wall portion and is situated adjacent the coffee outflow opening.

15. The coffee filter as claimed in claim 14 further characterized in that the valve is a disk valve with a closing face and having an annular projection situated on the closing face.

16. The coffee filter as claimed in claim 1 further characterized in that the valve is a disk valve with a closing face and having an annular projection situated on the closing face.

* * * * *